United States Patent [19]

Comignaghi et al.

[11] Patent Number: 5,627,757
[45] Date of Patent: May 6, 1997

[54] SYSTEM FOR MONITORING THE EFFICIENCY OF A CATALYST, IN PARTICULAR FOR MOTOR VEHICLES

[75] Inventors: Emilio Comignaghi, Mercallo; Aldo Perotto, Meana Di Susa, both of Italy

[73] Assignee: Fiat Auto S.p.A., Turin, Italy

[21] Appl. No.: 520,038

[22] Filed: Aug. 28, 1995

Related U.S. Application Data

[63] Continuation of Ser. No. 119,503, Sep. 10, 1993, abandoned.

[30] Foreign Application Priority Data

Sep. 14, 1992 [IT] Italy .................... TO92A0760

[51] Int. Cl.$^6$ .................... G06G 7/70; F01N 3/00
[52] U.S. Cl. .................... 364/431.051; 364/431.04; 364/431.03; 364/431.061; 60/274; 60/276; 60/277; 60/285; 73/118.1
[58] Field of Search .................... 364/431.05, 431.06, 364/431.03, 431.04, 510, 496, 497, 551.01; 60/276, 277, 274, 285, 278; 123/292, 688, 691, 674, 703; 73/118.1, 861.66, 118.2; 340/438, 633, 439

[56] References Cited

U.S. PATENT DOCUMENTS

| | | | |
|---|---|---|---|
| Re. 33,942 | 6/1992 | Katsuno et al. .................... | 60/274 |
| 3,939,654 | 2/1976 | Creps .................... | 60/276 |
| 4,622,809 | 11/1986 | Abthoff et al. .................... | 60/274 |
| 5,077,970 | 1/1992 | Hamburg .................... | 60/277 |
| 5,092,123 | 3/1992 | Nada et al. .................... | 60/274 |
| 5,095,878 | 3/1992 | Kumagi et al. .................... | 123/489 |
| 5,099,647 | 3/1992 | Hamburg .................... | 60/274 |
| 5,115,639 | 5/1992 | Gopp .................... | 60/274 |
| 5,157,920 | 10/1992 | Nakaniwa .................... | 60/274 |
| 5,177,464 | 1/1993 | Hamburg .................... | 60/277 |
| 5,224,345 | 7/1993 | Schnaibel et al. .................... | 60/274 |
| 5,228,335 | 7/1993 | Clemmens et al. .................... | 73/118.1 |
| 5,237,818 | 8/1993 | Ishii et al. .................... | 60/274 |
| 5,247,793 | 9/1993 | Yamada et al. .................... | 60/276 |
| 5,255,515 | 10/1993 | Blumenstock .................... | 60/274 |
| 5,267,472 | 12/1993 | Schneider et al. .................... | 73/118.1 |
| 5,268,086 | 12/1993 | Hamburg et al. .................... | 204/429 |
| 5,282,360 | 2/1994 | Hamburg et al. .................... | 60/274 |
| 5,307,625 | 5/1994 | Junginger et al. .................... | 60/274 |
| 5,313,791 | 5/1994 | Hamberg et al. .................... | 60/277 |
| 5,319,921 | 6/1994 | Gopp .................... | 60/274 |
| 5,337,555 | 8/1994 | Tokuda et al. .................... | 60/276 |
| 5,414,995 | 5/1995 | Tokuda et al. .................... | 60/276 |
| 5,487,269 | 1/1996 | Atanasyan et al. .................... | 60/274 |

FOREIGN PATENT DOCUMENTS

| | | |
|---|---|---|
| 3736259A | 7/1988 | Germany . |
| 3830515A | 3/1990 | Germany . |
| 3249320 | 4/1992 | Japan . |

*Primary Examiner*—Kevin J. Teska
*Assistant Examiner*—Jacques Louis-Jacques
*Attorney, Agent, or Firm*—Knobbe, Martens, Olson & Bear, LLP

[57] ABSTRACT

A system for measuring the efficiency of a motor vehicle catalytic converter through which gas flow passes. Two sensors monitor the gas conditions upstream and downstream of the catalytic converter and provide output signals to a microprocessor having dual input channels. The sensors may be lambda sensors. Each input channel leads to integration paths which receive the output from the sensors and calculate a variable average. The variable average is sent sequentially to a difference calculating node, a squaring node, and an integration module. The integration module sums intermediate signals over a period of time and generates output signals. The output signals are compared to each other and to reference values to determine if the catalytic converter is operating efficiently. A method of determining the efficiency of the catalytic converter using the aforementioned system is also provided.

27 Claims, 8 Drawing Sheets

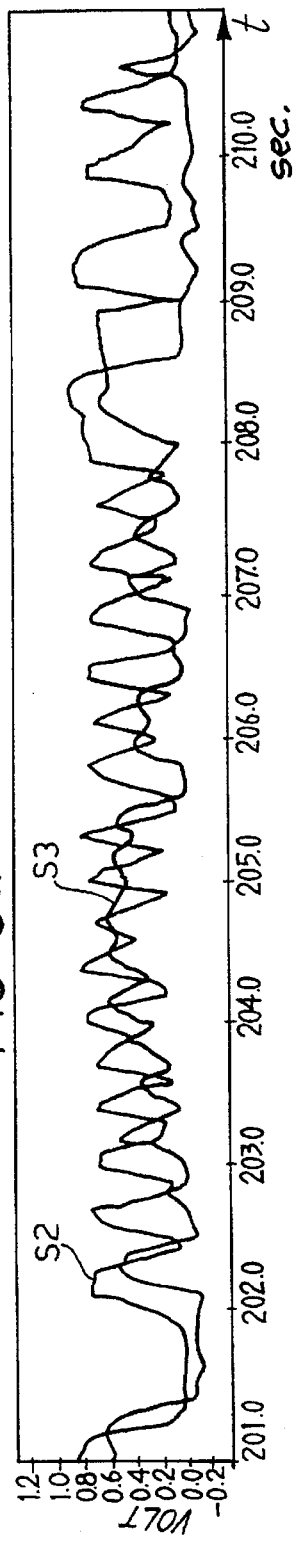
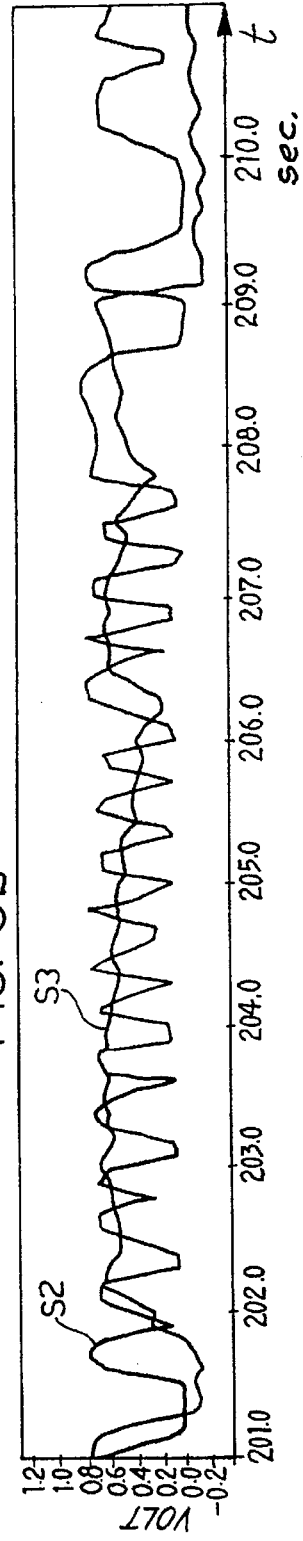
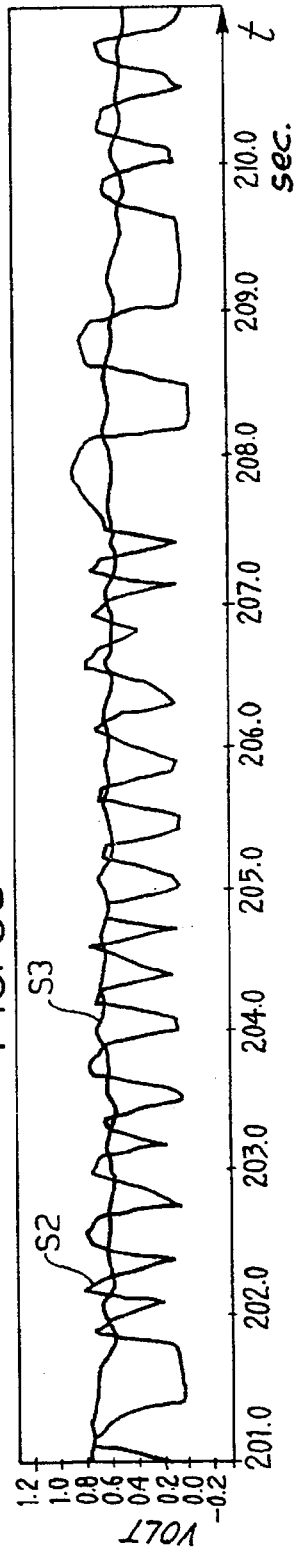

SYSTEM FOR MONITORING THE EFFICIENCY OF A CATALYST, IN PARTICULAR FOR MOTOR VEHICLES

This application is a continuation of U.S. patent application Ser. No. 08/119,503, filed Sep. 10, 1993, abandoned.

DESCRIPTION

1. Field of the Invention

The present invention relates to systems for monitoring the efficiency of catalysts for reducing the pollutants emitted by internal combustion engines, and in particular petrol engines, fitted in motor vehicles.

The present invention has been developed with particular reference to the need to comply with the anti-pollution standards planned in the motor vehicle industry, and in particular the standards soon to become generally applicable under the name of OBD (On-Board Diagnostics).

The starting point for legislation of this type was in 1988, with the OBD II standard, the definitive form of which was issued in 1991 by the C.A.R.B. (California Air Resources Board), and of which the introduction in California is planned for 1994. Further extensions of this legislation have been proposed in the United States by the EPA (Environment Protection Agency), and also in Europe, under the common name of EOBD (European On-Board Diagnostics).

The OBD II specifications include installation in motor vehicles of electronic systems which can monitor periodically the efficiency of anti-pollution devices, or in general, can detect and indicate the occurrence of phenomena liable to produce an excessive increase in emissions by the vehicle.

The main anti-pollution device, which requires monitoring in order to indicate malfunctioning in terms of the exceeding of the threshold values for emissions measured in the type-approval test cycle (for example the so-called FTP '75 cycle), is the catalyst disposed along the exhaust pipe.

2. Description of the Prior Art

The solutions adopted hitherto for monitoring the conversion efficiency of the catalyst (for example in the context of a so-called catalytic converter) can be attributed substantially to two different basic approaches.

A first type of solution is based on the use of exhaust gas temperature sensors, and aims to provide a measurement of the efficiency of the catalyst, on the basis of the temperature rise generated owing to the exothermic nature of the gas conversion process and measured upstream and downstream of the catalyst.

Solutions of the second type in general include the use of two sensors (so-called lambda sensors) disposed respectively upstream and downstream of the catalyst. A comparison can thus be made between the signals sensed by the two lambda sensors, upstream and downstream respectively of the catalyst, the behaviour pattern of which signals is correlated with the conversion efficiency of the catalyst, as will be seen in greater detail hereinafter. For a general overview of the prior art the following documents are of interest: DE-A-3 830 515, U.S. Pat. Nos. 3,939,654, 4,622, 809, DE-A-3 736 259 and Patent Abstracts of Japan vol. 016, No. 044 (M 1207) Feb. 4, 1992 & JP-A-3 249 320.

OBJECT AND SUMMARY OF THE PRESENT INVENTION

The solution according to the invention can be attributed substantially to the second type of solution described above.

The basic problem which underlies the present invention is to provide a system which on the one hand enables effective self diagnosis of the catalyst efficiency and on the other hand permits use of an intrinsically simple structure which is small in size (and also as far as occupation of the memory of the calculation means associated with the system processing unit is concerned), so as to produce an efficient, and simultaneously low-cost system, such that a high degree of reliability is provided even in adverse environmental conditions, such as those prevailing when the system is fitted onto a motor vehicle.

This object is achieved according to the present invention by means of a system which has the features described specifically in the following claims.

As a general consideration, it is important to point out that the solution according to the invention has been developed on the basis of results obtained in the normal conditions encountered in the test cycle known as the FTP '75 cycle and thus without using test signals such that the output forced produced as a result of the carrying-out of the test cycle is inevitable because of the condition of the fuel-mixture-ratio control (which is in a closed loop with the lambda sensor disposed upstream of the catalyst).

DESCRIPTION OF THE DRAWINGS

The invention will now be described purely by way of non-limiting example, with reference to the attached drawings, in which:

FIG. 6a is a graph showing the superimposed outputs over time of two sensors positioned upstream and downstream of the first catalytic converter;

FIG. 6b is a graph showing the superimposed outputs over time of two sensors positioned upstream and downstream of the second catalytic converter;

FIG. 6c is a graph showing the superimposed outputs over time of two sensors positioned upstream and downstream of the third catalytic converter;

DETAILED DESCRIPTION OF THE INVENTION

Figure 1:
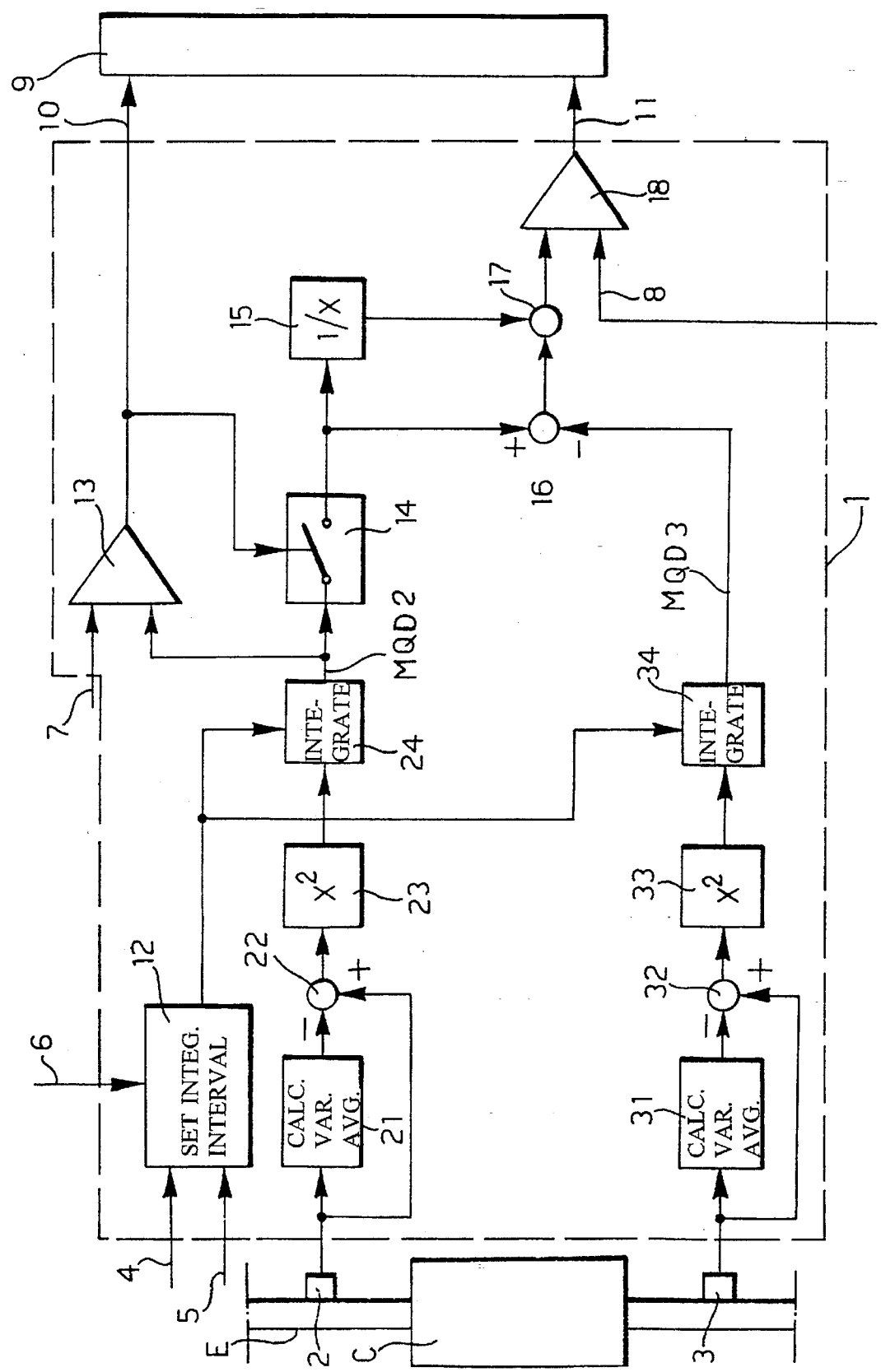
FIG. 1 is a block diagram illustrating a general circuit structure of a system according to the present invention.

The system according to the invention, indicated 1 as a whole, is to be connected at its inputs to two lambda sensors (of a known type) 2, 3 disposed respectively upstream and downstream of a catalyst. In a typical embodiment of the invention, this is the so-called monolith C of a catalytic converter fitted to the exhaust pipe E of a motor vehicle (not shown as a whole), powered by an internal combustion engine (not shown in the drawings), such as a petrol engine.

It will be appreciated that the terms "upstream" and "downstream" refer to the direction of flow of the gases inside the exhaust pipe E of the engine.

In addition to the signals generated by the two lambda sensors 2, 3, the system 1 is also sensitive to a number of parameters which can be determined selectively (in a variable manner or definitively, for example in the stage in which the system is calibrated), such as:

- a signal indicative of the value of the engine speed, delivered on a line 4,
- a signal indicative of the value of the pressure measured in the intake manifold of the engine and/or to the air flow drawn into the manifold, indicating the torque generated by the engine, (or the load to which the engine is subjected), delivered on line 5,
- an indication of the condition of the combustion mixture ratio control, delivered on a line 6,
- a signal relating to the diagnostic threshold level pertaining to the lambda sensors (in particular as far as sensor 2 disposed upstream is concerned) delivered on an input line 7, and
- a signal relating to the diagnostic threshold level of the catalyst, delivered on a line 8.

On the basis of these signals and in accordance with the aforementioned parameters, the system 1 outputs to a display or warning unit 9 (such as a luminous and/or acoustic warning device, or a liquid crystal display unit) and/or to the input of a further processing system, mounted on board the vehicle, and/or optionally to a system for transmitting the signals detected to exterior of the vehicle, at least two output signals indicating respectively:

the efficiency of the lambda sensor 2 (output line 10), the efficiency of the catalyst C (output line 11).

The system 1 is suitable to be formed by an electronic processing unit, such as for example a microprocessor. In this case the output signals of the lambda sensors 2, 3 are applied to respective interfaces/input modules of the processing unit, whereas the lines 6 to 8 constitute normal data inputs which can optionally be programmed selectively. The output lines 10 and 11 generally correspond to normal interface output lines suitable for piloting a display unit and/or a further processing unit/transmitter which uses the output signals of the system 1.

It will be appreciated that the structure of the system 1, described hereinafter with particular reference to functional blocks, can be produced at programming level in the form of processing functions of the said electronic processing unit: all of the above is in accordance with criteria well-known to persons skilled in the art, and is not significant for the purposes of understanding the invention, and thus need not be described at this point.

The signals of the lambda sensors 2, 3 (which signals are designated S2 and S3 respectively hereinafter) are transmitted at the input of the system 1 to two parallel input channels, each of which has substantially the same structure. Each of these channels in fact comprises:

- a variable-average calculating module 21, 31, of which the output is transmitted with a negative sign to an adding node 22, 32 which also receives the input signal of the variable average calculating module 21, 31 with a positive sign;
- a squaring module 23, 33 the input of which receives the output signal of the adding node 22, 32, and
- an integration module 24, 34 the input of which receives the output signal of the squaring module 23, 33 and which is controlled, as far as its operation is concerned, by a further module 12 which defines the enabling criteria (duration of the period of integration) and is controlled by the input lines 4 to 6.

The output signal of the integrator 24 associated with the input channel connected to the lambda sensor 2 (disposed upstream of the catalyst C) is then transmitted both to a threshold circuit 13, of which the threshold 13 is defined by the input 7 (diagnostic threshold, lambda sensor 2), and to a switch 14 of which the opening/closing is controlled by the output of the threshold module 13. In the closed position, the switch 14 transfers the output of the integrator both to a module 15 for calculating a reciprocal (1/X), and to a further adding node 16, which also receives the output signal of the integrator 34 of the channel associated with the lambda sensor 3 disposed downstream of the catalyst.

The two output signals of the integrators 24 and 34 have opposite signs as they reach the node 16: a positive sign for the integrator 24 (upstream lambda sensor 2) and a negative sign for the integrator 34 (lambda sensor 3 disposed downstream of the catalyst). The output signals of the reciprocal calculating module 15 and of the adding node 16 are then taken to a multiplication node 17, and are then applied to the input of a threshold circuit (comparator 18) of which the threshold is defined by the input 8. The output signals of the comparator circuits 13 and 18 in fact constitute the efficiency indication signals to be conveyed on the lines 10 and 11 to the output circuit 9.

It should be mentioned that the lines 10 and 11, shown here as separate lines, can in fact be represented by a single output line on which the respective signals are transmitted alternately. Again, according to criteria well known to persons skilled in the art, the two threshold comparator circuits 13, 18 (as is the case for other circuits shown separately in FIG. 1) can in fact be integrated into a single function which plays the part of two circuits previously described, according to a general time division plan.

THEORETICAL BASES OF THE INVENTION

Without wishing to limit the invention absolutely to any explanatory principle, the Applicant consider it useful to illustrate hereinafter some results and experimental tests which clarify the manner in which the system according to the invention operates.

Figure 2B:
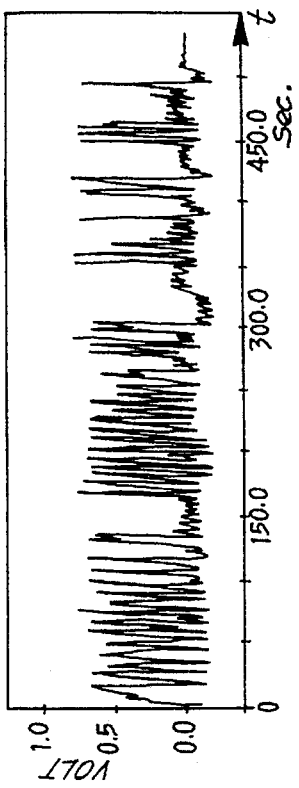
FIG. 2b is a graph showing the output over time of a sensor positioned downstream of the first catalytic converter.
Figure 3B:
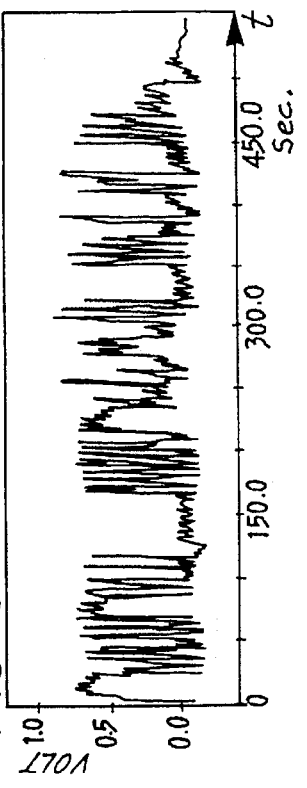
FIG. 3b is a graph showing the output over time of a sensor positioned downstream of the second catalytic converter.
Figure 4B:
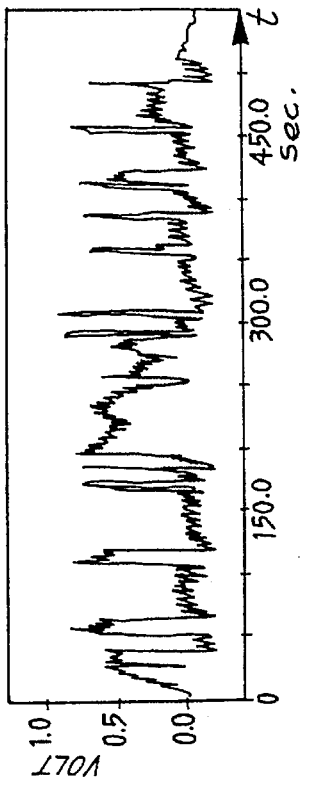
FIG. 4b is a graph of the output over time of a sensor positioned downstream of the third catalytic converter.

Each of the FIGS. 2 to 4 comprises two time graphs, indicated 2a and 2b, 3a and 3b, and 4a and 4b which show typical time curves of the output signals (voltages) of the two lambda sensors 2 and 3 disposed upstream and downstream of the catalyst C, respectively, as functions of the time t,—the graphs 2a, 3a, 4a relating to the sensor 2 and the graphs 2b, 3b, 4b relating to the sensor 3. In particular FIGS. 2, 3 and 4 refer to data obtained with reference to three different catalysts C of the type currently fitted in the Fiat Croma 2.0 i.e. cat motor vehicle produced by the Assignee of the present application. These data have been obtained in a manner such as to create a sufficiently significant statistical sample of different conversion efficiency values.

In particular the catalysts in question were subjected to artificial or accelerated ageing on the basis of the following criteria:

ageing on a car (distance of 85,000 Km on a Croma 2.0 i.e. cat car);

ageing by the presence of engine oil in the exhaust gases (simulation of oil blowing by the piston rings fitted in the cylinders, and checking of deterioration of the monolith caused by sulphur deposits);

ageing caused by lead in the fuel;

ageing caused by reduction of the exchange surface of the monolith (simulated by the removal of part of the volume of the monolith of the catalyst); and ageing by thermal de-activation (simulation by heating the catalyst monolith in an oven).

The catalysts thus aged were each subjected to an FTP '75 cycle (plus an additional cycle for checking the repeatability of results), again on a Fiat Croma 2.0 i.e. cat.

Upstream and downstream of the catalysts C there were mounted respectively two lambda sensors, and two linear probes (U.E.G.O. probes) as controls.

In particular the graphs in FIGS. 2 to 4 refer to the third stage of the FTP '75 cycle (505 HOT stage).

The emission values recorded for the three catalysts in the FTP '75 cycle are listed in the Table I below.

TABLE I

| Catalyst | Type of ageing | HC (g/mile) | CO (g/mile) | NOx (g/mile) |
|---|---|---|---|---|
| FIG. 2 | 85000 Km | 0.894 | 3.013 | 1.299 |
| FIG. 3 | oil | 0.419 | 1.840 | 0.811 |
| FIG. 4 | new | 0.237 | 0.999 | 0.550 |

Figure 2A:
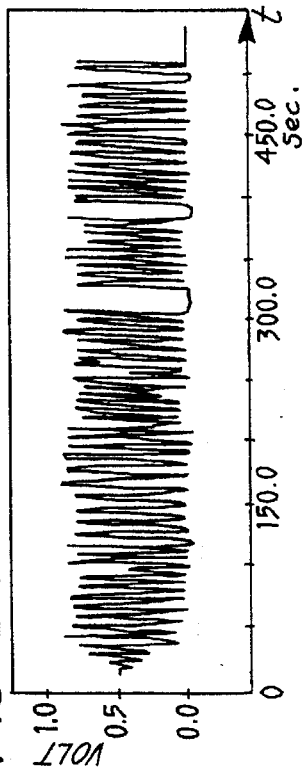
FIG. 2a is a graph showing the output over time of a sensor positioned upstream of a first catalytic converter.
Figure 3A:
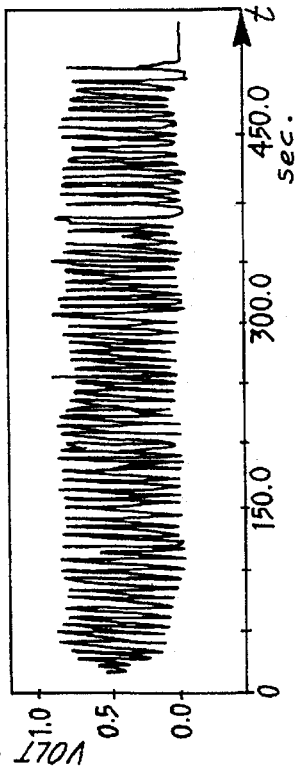
FIG. 3a is a graph of the output over time of a sensor positioned upstream of a second catalytic converter.
Figure 4A:
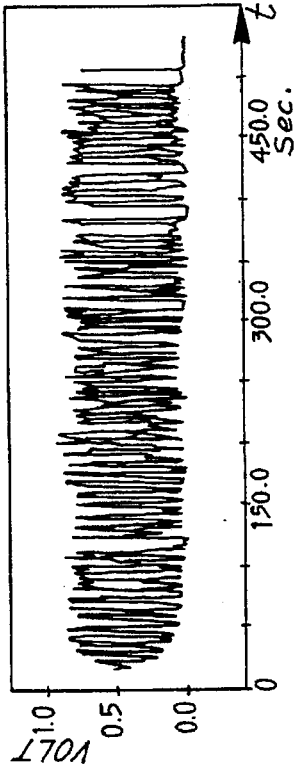
FIG. 4a is a graph of the output over time of a sensor positioned upstream of a third catalytic converter.

Comparative analysis of the signals of the two lambda sensors 2 and 3 disposed respectively upstream and downstream of each of the three catalysts examined, shows that in order of increasing efficiency from FIG. 2 to FIG. 4, shows that, compared with a virtually regular performance of the lambda sensor 2 disposed upstream of the catalyst C (see the three graphs in FIGS. 2a, 3a and 4a), very different behaviour patterns are displayed by the output signals of the lambda sensor 3 disposed downstream of the catalysts C.

It can be seen that, going from the most efficient catalyst (that in FIG. 4) to the least efficient catalyst (that in FIG. 2), the behaviour of the lambda sensor 3 disposed downstream tends to repeat increasingly that of the lambda sensor 2 disposed upstream, following in an increasingly uniform manner the oscillations induced by the closed-loop mixture ratio control strategy (line 6) set in the respective control unit (not shown).

This situation confirms the theory, known from the literature, that once a catalyst has deteriorated, there is a reduction in its oxygen storage capacity, by means of which the oxygen obtained from the NOx reduction reactions is retained inside the monolith, in order simultaneously to bring about the HC and CO oxidation reactions.

The gradual loss of this capacity owing to the numerous causes of ageing gradually leads to alteration of the catalyst's normal characteristic of reducing the extent of the mixture ratio variations (which can be detected by the lambda sensor 2) upstream of the catalyst; these variations thus also tend to be repeated increasingly downstream of the catalyst C, owing to the faster release of oxygen, which is no longer retained by the catalyst.

The solution according to the invention provides an index relating to the capacity of the signal of the lambda sensor 3 disposed downstream of the catalyst to follow the behaviour of the upstream sensor 2, thus obtaining a measurement of the loss of efficiency of the catalyst C disposed between the two sensors.

Figure 5A:
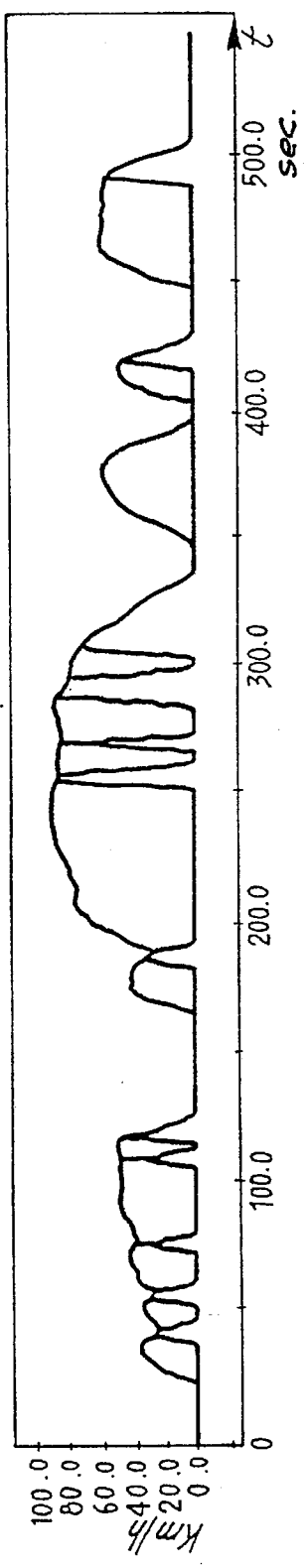
FIG. 5a is a graph showing the speed variation over time of a vehicle in a decelerating condition.
Figure 5B:
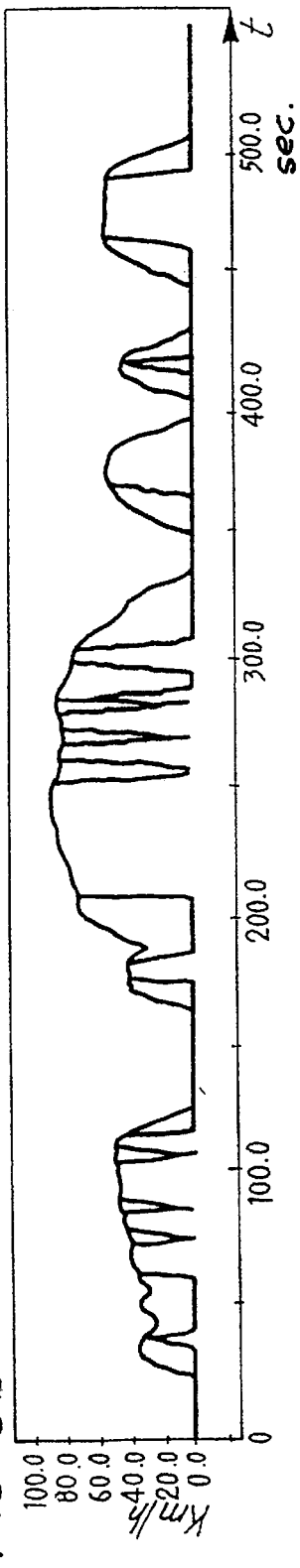
FIG. 5b is a graph showing the speed variation over time of a vehicle in a cruise condition.
Figure 5C:
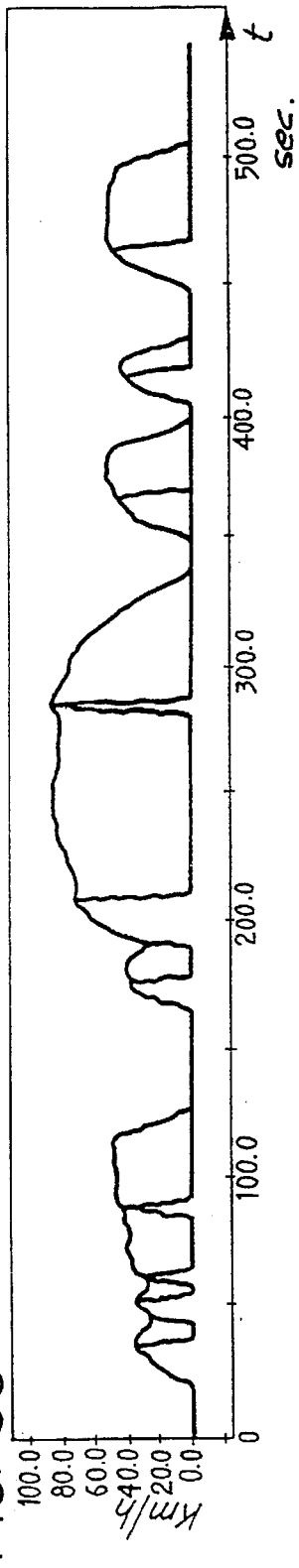
FIG. 5c is a graph showing the speed variation over time of a vehicle in an accelerating condition.

FIG. 5, which is subdivided into three superimposed graphs designated respectively 5a, 5b and 5c, shows typical curves of speed variations of velocity measured in three different conditions of use in accordance with the FTP '75 cycle as functions of the time t.

On the basis of information supplied by the California Air Resources Board (CARB) and of the first specifications concerning the OBD II standards, it is conceivable to limit the period in which the behaviour of the lambda sensors 2 and 3 upstream and downstream of the catalyst is investigated, to a suitably stable range of vehicle speeds, which can be taken from the profile of the FTP '75 cycle, in particular by checking initially for the presence of such a range in the third stage of the cycle. This selection definitely appears to be justified on the basis of the OBD II standard, which requires monitoring of the catalyst at least once per driving cycle: if such a cycle is identified by the normal FTP '75 test for type approval, it appears to be acceptable to evaluate the method on the basis of a driving condition which is always encountered during this cycle. FIG. 5 shows how it is possible to identify this range by considering cycle sections in which the variation of speed in periods of three seconds is between −0.5 km/h/sec and 1 km/h/sec: this condition refers to an analysis of the FTP '75 cycle encountered in the literature and intended to identify similar conditions for executing a type of monitoring other than that described. For this purpose a data processing programme can be used to acquire the data relating to the speed and to the lambda sensors upstream and downstream of the catalyst, measured in the hot stage of the FTP cycle, and to assess off-line the derivative of the speed signal acquired. Three driving conditions can thus be identified from the cycle, in other words:

- a first condition (graph in FIG. 5a), in which the variation of speed in the 3-second period is less than 0.5 km/h/sec (DEC, or deceleration condition);
- a second condition (graph in FIG. 5b), in which the variation of speed in the 3-second period is between −0.5 and +1 km/h/sec (CRUISE condition), and
- a third condition (graph in FIG. 5c), in which the variation of speed in the 3-second period is greater than 1 km/h/sec (ACC or acceleration condition).

If the required conditions are then examined with reference to the cruise condition (diagram in FIG. 5b), a very long series of consecutive periods of three seconds in the same conditions can be identified, thus obtaining a time interval which is sufficiently long to eliminate any irregularities in the behaviour of the two sensors 2 and 3.

As far as the three catalysts previously used as an example are concerned, this interval corresponds to the period of 48 seconds (16 consecutive periods of three seconds each) between the 207th and 255th second of the 505 seconds of each hot stage of the FTP '75 cycle.

At this point, by extrapolating the lambda sensor signals over the same period of time, a pair of comparable signals can be obtained for each catalyst and used in order to determine the most suitable method of quantifying the difference in behaviour between the lambda sensors upstream and downstream of the catalyst.

Accurate information on the behaviour of the sensors in question can be obtained by analysing the three pairs of signals relating to the three catalysts, and shown in the three superimposed graphs in FIGS. 6a, 6b, 6c.

In particular the three graphs in FIG. 6 show, in relation to a time scale t, the output signals (in volts) of the two sensors 2 and 3 disposed upstream (signal S2) and downstream (signal S3) respectively of the catalyst C for the same three catalysts to which the graphs in FIGS. 2a, b, 3a, b and 4a, b, and the data in Table 1 refer.

By comparing these signals, it can be seen that the less oscillatory behaviour of the lambda sensor 3 disposed downstream of the catalyst is characterised by the same oscillation frequency as the output signal of the upstream sensor (this can be seen by comparing the correspondence of the peaks of the two signals S2 and S3, even though these are out of phase owing to the time taken by the gases to pass from one sensor to the other). The effective comparison of the output signals of the sensors can thus be limited to an analysis of their amplitudes.

On the basis of these facts, it is apparent that a significant indication of the relative behaviour of the two sensors 2 and 3 can be obtained by comparing the output signal of each sensor and its variable average taken at a number of points to which parameters can be ascribed. In this respect experiments carried out by the Applicant show that a three-point reference is sufficient.

Figure 7:
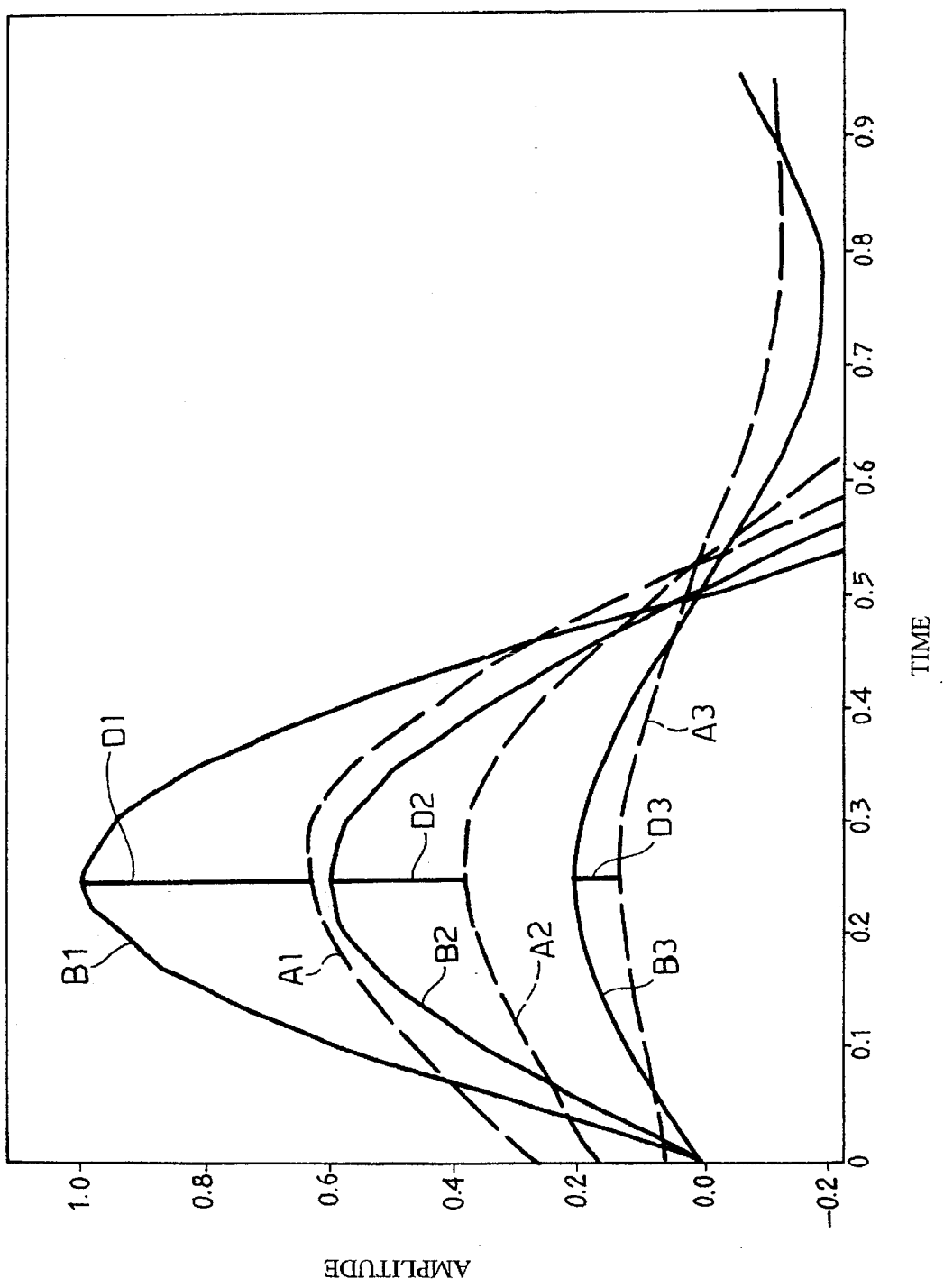
FIG. 7 is a graph showing three sine curves of differing amplitudes and their respective variable averages.
Figure 8A:
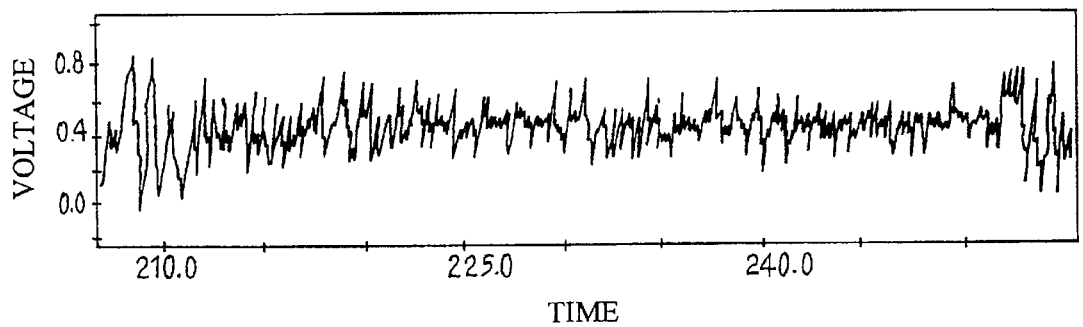
FIG. 8a is a graph showing a moving average of the output over time of a sensor positioned upstream of the first catalytic converter.
Figure 8B:
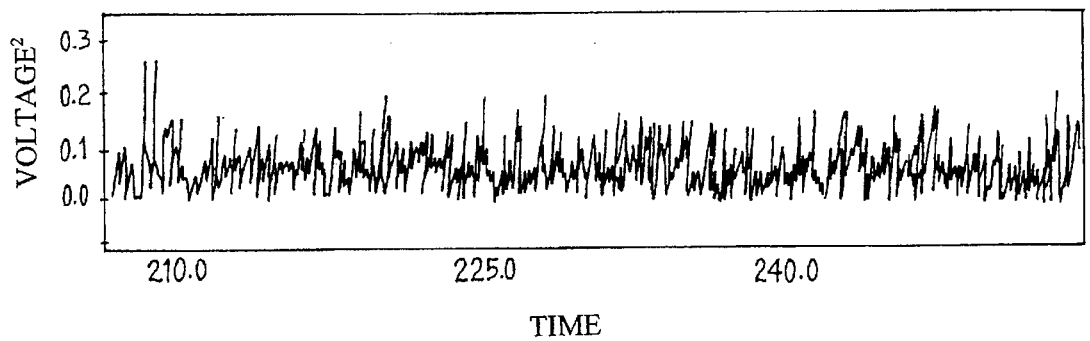
FIG. 8b is a graph showing a mean quadratic deviation of the output over time of a sensor positioned upstream of the first catalytic converter.
Figure 8C:
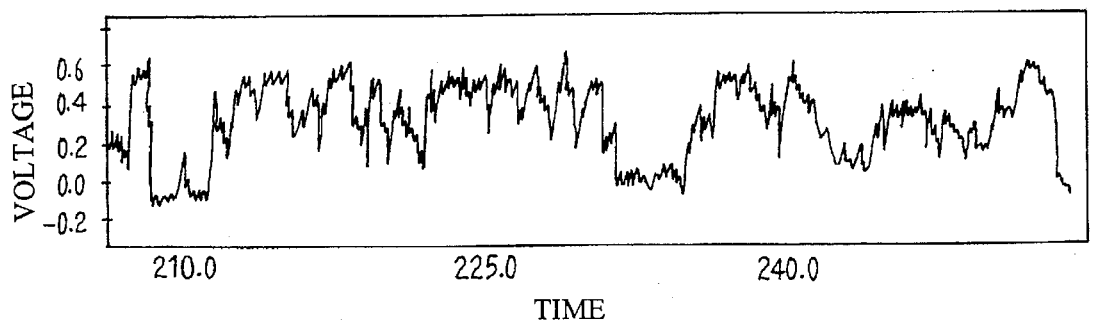
FIG. 8c is a graph showing a moving average of the output over time of a sensor positioned downstream of the first catalytic converter.
Figure 8D:
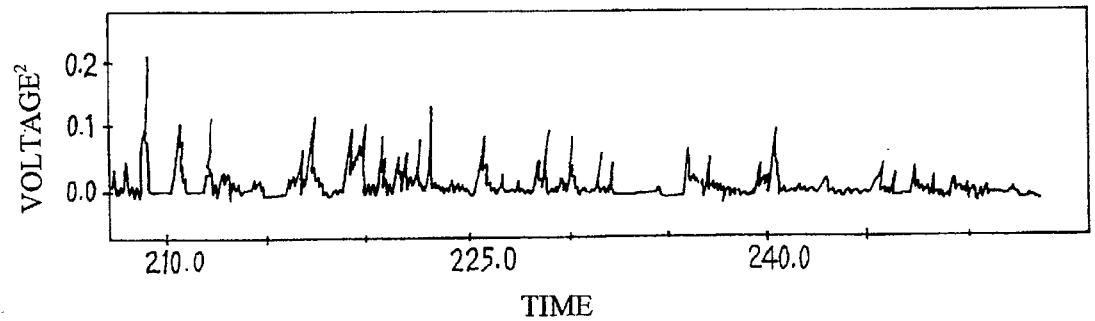
FIG. 8d is a graph showing a mean quadratic deviation of the output over time of a sensor positioned downstream of the first catalytic converter.
Figure 9A:
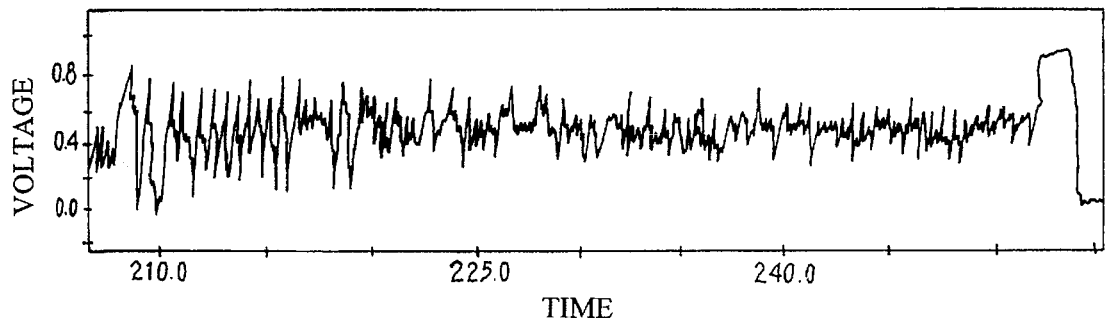
FIG. 9a is a graph showing a moving average of the output over time of a sensor positioned upstream of the second catalytic converter.
Figure 9B:
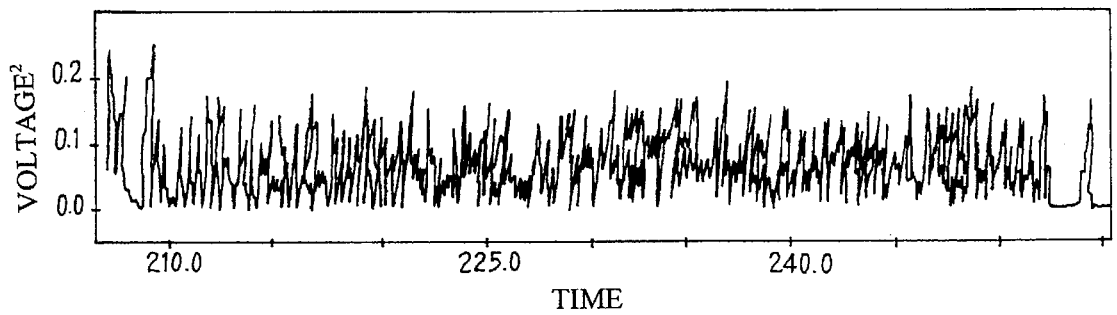
FIG. 9b is a graph showing a mean quadratic deviation of the output over time of a sensor positioned upstream of the second catalytic converter.
Figure 9C:
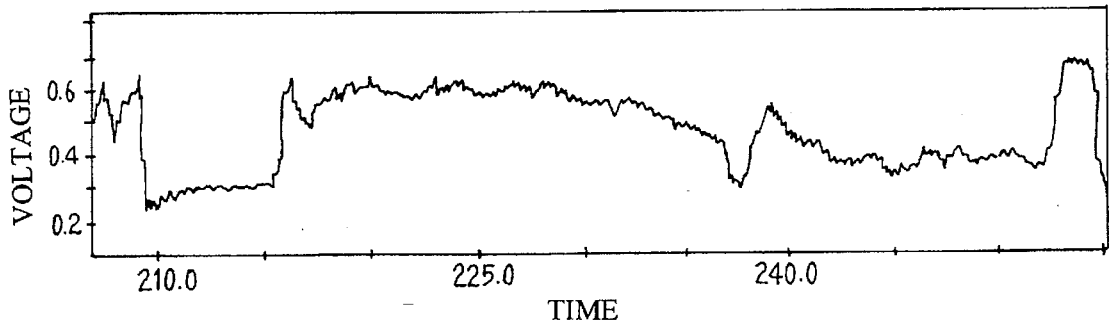
FIG. 9c is a graph showing a moving average of the output over time of a sensor positioned downstream of the second catalytic converter.
Figure 9D:
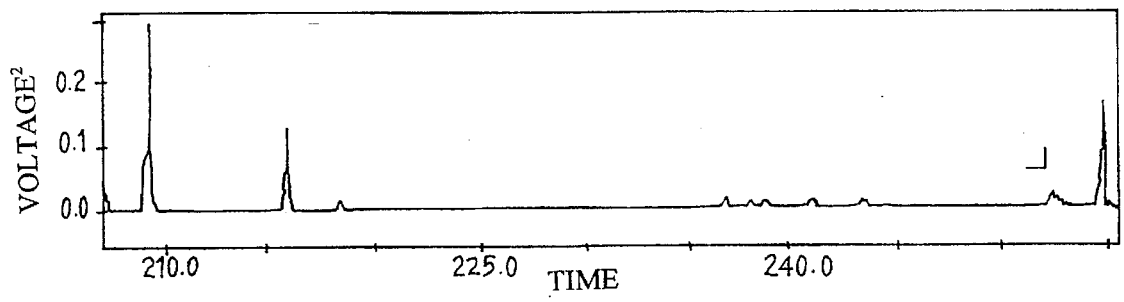
FIG. 9d is a graph showing a mean quadratic deviation of the output over time of a sensor positioned downstream of the second catalytic converter.
Figure 10A:
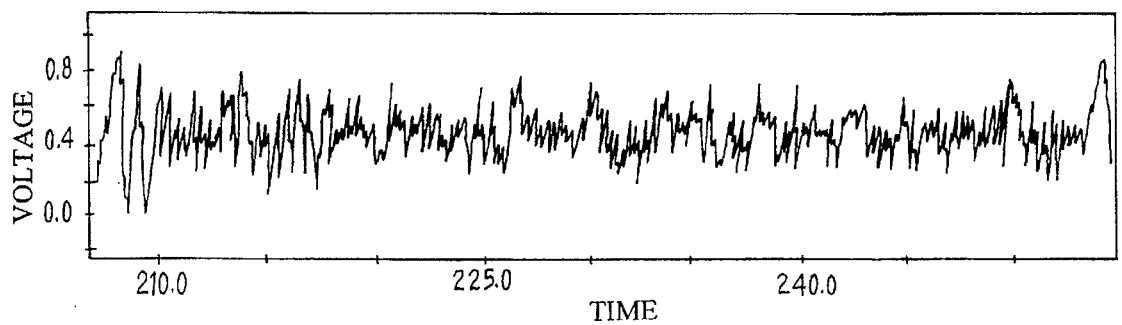
FIG. 10a is a graph showing a moving average of the output over time of a sensor positioned upstream of the third catalytic converter.
Figure 10B:
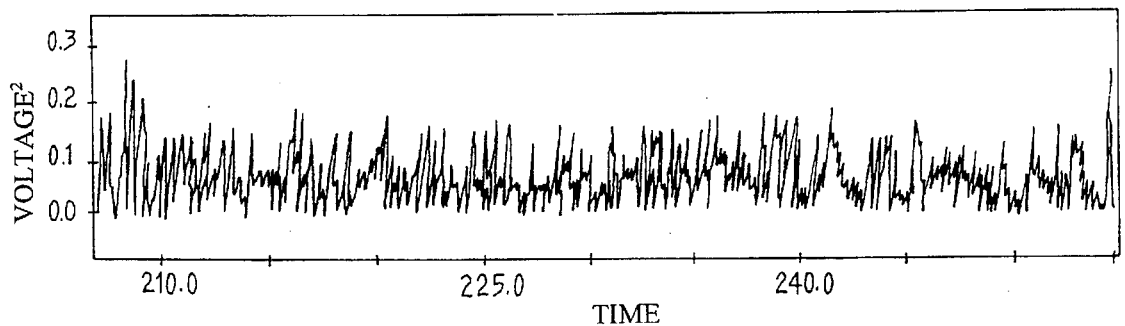
FIG. 10b is a graph showing a mean quadratic deviation of the output over time of a sensor positioned upstream of the third catalytic converter.
Figure 10C:
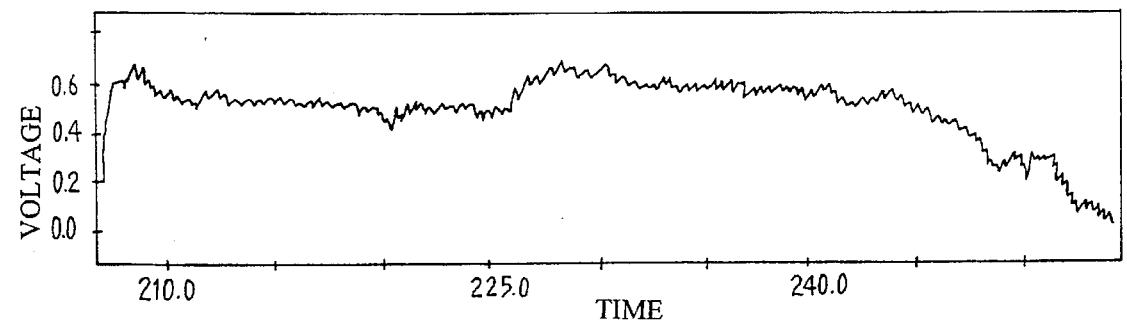
FIG. 10c is a graph showing a moving average of the output over time of a sensor positioned downstream of the third catalytic converter.
Figure 10D:
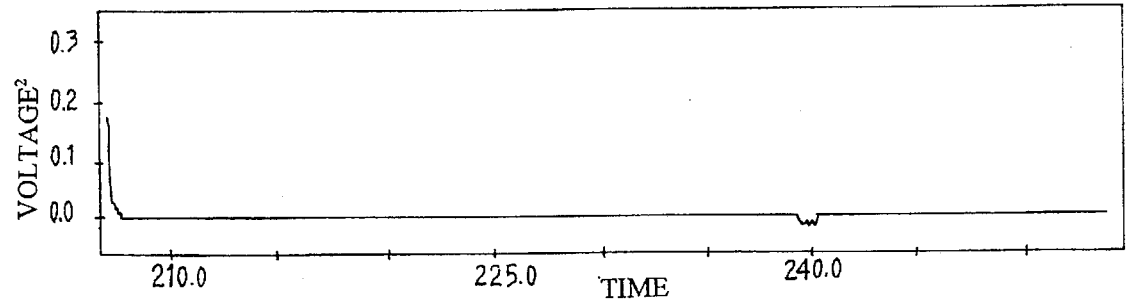
FIG. 10d is a graph showing a mean quadratic deviation of the output over time of a sensor positioned downstream of the third catalytic converter.

For three sine curves, designated respectively P1, P2 and P3, which have the same frequency and normalised amplitudes of 1, 0.6 and 0.2 respectively, FIG. 7 shows the behaviour pattern of the respective variable averages A1, A2 and A3 (as a discontinuous line), defined on the basis of the general equation $$\overline{V} = \frac{V_{(K-2)} + V_{(K-1)} + V_K}{3} \qquad K = [2 - \infty]$$

in which $\overline{V}$ is the variable moving average of the variable V obtained from three successive values measured at the points, or at the moments K-2, K-1 and K.

FIG. 7 shows how, for a given frequency, the difference between the value of the signal P1, P2, P3 and its variable average A1, A2, A3 measured at the signal peak (the difference is indicated by the thick line sections D1, D2 or D3), is magnified by the variation in the amplitude of the signal. It can be seen that this occurs in a particularly noticeable manner when a comparison is made between responses which are provided by signals such as the signals S2 and S3 supplied by the sensors 2 and 3 and which have different amplitudes corresponding to different capacities of the catalyst C to reduce the amplitudes of the oscillations detectable downstream of the catalyst.

DESCRIPTION OF USE OF THE INVENTION

In practice it is found that the above-described differences are further magnified if the signal indicating the difference between the instantaneous value and the moving average (difference signal which in the diagram in FIG. 1 is calculated in the adding modules 22 and 32) is squared (as is the case in modules 23 and 33). If these difference signals are also integrated (in the modules 24 and 34) once they have been squared, for both the signals 2 and 3, which are considered to be part of a random process, the mean quadratic deviation can be calculated for the period in question, which is determined by the unit 12 in accordance with the parameters supplied as inputs on lines 4, 5 and 6.

In general the module 12 does not actually carry out a calculation, but consists of a type of table which, according to the running speed, load and mixture-ratio control values (which are applied definitively when the system is calibrated, or may be variable according to the control signals obtained from other systems fitted on board the motor vehicle), defines the recurrence and duration of the integration interval in which the modules 24 and 34 act.

FIGS. 8 to 10 show the typical curves of the signals measured at the outputs of the circuits 21 and 31, for calculating the moving average for the sensor 2 (graphs 8a, 9a, 10a) and for the sensor 3 (graphs 8c, 9c, 10c) respectively, as well as the result of calculating the mean quadratic deviation (output of the modules 24 and 34), again in relation to the sensor 2 (graphs 8b, 9b, 10b) and to the sensor 3 (graphs 8d, 9d, 10d). All of this applies to each of the catalysts, to which the data in FIG. 2 (FIG. 8), FIG. 3 (FIG. 9) and FIG. 4 (FIG. 10) applies respectively.

The data recorded for the three catalysts in question is also summarised in Table II hereinbelow.

TABLE II

| Catalyst | Int. MQD2 Sensor 2 | Int. MQD3 Sensor 3 | Integ. ratio MQD2/ MQD3 | Integ. diff. MQD2/ MQD3 |
| --- | --- | --- | --- | --- |
| Fig.2–Fig.8 | 3.3452 | 0.7058 | 4.7396 | 2.6394 |
| Fig.3–Fig.9 | 2.9538 | 0.2031 | 14.5436 | 2.7507 |
| Fig.4–Fig.10 | 3.1012 | 0.0960 | 32.3042 | 3.0052 |

It will be appreciated that Table II in question must be read in association, and to supplement, Table I above. As can be seen, the ratio between the integrals of the mean quadratic deviations provides an index which expresses the efficiency of the catalyst: the lower the index, the lower the emission values measured in the cycle. The ratio in question is calculated by dividing the integral value (MQD2) produced by the module 24, from the signal of the upstream sensor 2, by the integral value (MQD3) produced by the module 34 from the signal of the downstream sensor 3.

It can also be seen that a similar but less meaningful indication can be obtained by calculating the difference between these integrals (MQD2–MQD3).

The system 1 illustrated in FIG. 1 also permits a situation in which the upstream sensor 2 can no longer be considered efficient, to be detected by assessing the value of the integral MQD2 relating to the sensor 2: all of this is in accordance with the diagnostic threshold value 7 set in the comparator 13.

When the signal of the integral MQD2 produced by the module 24 reaches this threshold value, the comparator 13 disenables the system for measuring the efficiency of the catalyst C by opening the electronic switch 14; in these conditions the integral signal MQD2 from the module 24 no longer reaches the other processing modules 15 and 17.

Simultaneously, by means of the line 10, the comparator 13 gives rise to a warning signal on the unit 9.

In normal use, when the integral signal MQD2 produced by the module 24 indicates that the sensor 2 is functioning efficiently, the comparator 13 keeps the switch 14 in the closed position, so that the modules 15 and 17 receive the signal MQD2.

In practice, on the basis of the signals MQD2 and MQD3, these modules calculate a signal which can be expressed as:

$$\frac{1}{MQD2} \times (MQD2 - MQD3) = 1 - \frac{MQD2}{MQD3}$$

in other words, a combined signal of the ratio and the difference between the integrals, to be compared with the threshold set on the comparator 18 so as to indicate, when the diagnostic threshold set on the comparator 18 has been reached, that the catalyst C can no longer be considered efficient and will give rise to rather high emission values. In these conditions, the comparator 18 transmits a corresponding warning signal to the unit 9 on the lines 11.

Naturally, the principle of the invention remaining the same, the details of construction and forms of embodiment may vary widely with respect to those described and illustrated, without thereby departing from the scope of the present invention. In particular the efficiency measuring system previously described can be applied with reference to the sensor 2, to the sensor 3, or to both sensors. Additionally, the threshold function fulfilled by the comparator 18 can be carried out by means of signals derived from MQD2 and MQD3 signals other than the ratio/difference signals referred to previously, or by means of other signals derived from the circuits 21, 22, 31 and 32.

What is claimed is:

1. A system for measuring an efficiency of a catalyst through which gas flow is intended to pass, including at least two sensors such as lambda sensors which are disposed in use respectively upstream and downstream of said catalyst in the direction of the gas flow and which generate respective output signals, said system including:

first and second calculation means for calculating moving averages of the output signals:

third and fourth calculation means each for calculating differences between instantaneous values of the output signals from one of said upstream or downstream sensors and said moving averages of the first and second calculation means, respectively, in order to generate difference signals;

fifth calculation means for calculating output efficiency signals having values indicative of the efficiency of the catalyst on the basis of the difference signals or signals derived therefrom; and a warning unit, said warning unit responsive to values of said efficiency signals to generate a warning indicating when said catalyst is operating inefficiently.

2. A system according to claim 1, wherein the fifth calculation means calculates the output efficiency signals from at least one of a ratio and a difference between the difference signals or signals derived therefrom.

3. A system according to claim 1, wherein the fifth calculation means comprises modules for squaring the difference signals.

4. A system according to claim 1 wherein the third calculation means comprises integration modules for integrating the difference signals.

5. A system according to claim 4 wherein the integration modules act within selectively predetermined time intervals.

6. A system according to claim 5, including means for determining the duration of the intervals in which the integration modules act, according to parameters selected from the group consisting of:

the condition of a fuel mixture-ratio control which gives rise to the gases passing through the catalyst;

the running speed of a combustion unit which gives rise to the exhaust gases; and the load on the combustion unit.

7. A system according to claim 1, wherein the fifth calculation means comprises modules for squaring the difference signals and integration modules for integrating the difference signals; wherein the integration modules act on the signal output by the squaring modules; and wherein the fifth calculation means calculates said output efficiency signals from the output signals of the integration modules.

8. A system according to claim 1, including diagnostic means sensitive to the value of at least one of the difference signals or a signal derived therefrom and which can compare the value of the said at least one of the difference signals or a signal derived therefrom with a predetermined threshold in order to identify the malfunctioning of the sensor so that, in the event of malfunctioning, the calculation of the respective output efficiency signal is prevented.

9. A system according to claim 8, wherein the diagnostic means is sensitive to the said at least one of the difference signals which has been squared and integrated.

10. A system according to claim 8, wherein said at least one difference signal is that which relates to the sensor in use upstream of the catalyst.

11. A system according to claim 8, further comprising a line for emitting a corresponding warning signal, when this malfunctioning condition exists, said line being associated with the diagnostic means.

12. A system according to claim 1, further comprising comparison means associated with said fifth calculation means, said comparison means comparing the output efficiency signal of the fifth calculation means with a selectively predetermined threshold, in order to communicate a warning signal to said warning unit when said threshold is reached.

13. A system for monitoring efficiency of a catalyst of an internal combustion engine by analysis of upstream and downstream signals, comprising:
- a first lambda sensor which samples gases upstream of said catalyst and which generates a first input signal;
- a second lambda sensor which samples gases downstream of said catalyst and which generates a second input signal;
- a microprocessor having dual input channels, said channels receiving said first and second input signals, each of said channels comprising:
  - a variable-average calculating module which calculates moving averages of the input signals;
  - a difference calculating node which calculates first sets of differences between instantaneous values of the input signals and the moving averages; and
  - a means for receiving said sets of differences and calculating output signals over an operating period of said catalyst;
- means for calculating efficiency signals indicative of the efficiency of the catalyst on the basis of said output signals; and
- a warning unit sensitive to said efficiency signals to communicate the condition of said catalyst.

14. A system according to claim 13, wherein said means for receiving said sets of differences and calculating output signals comprises:
- a squaring module which squares said first sets of differences and which generates intermediate signals; and
- an integration module which sums said intermediate signals over a period and which generates said output signals, said output signals representing mean quadratic deviations of said input signals.

15. A system according to claim 14, wherein said microprocessor includes an enabling module which receives external parameters and sets said period over which said integration module generates said mean quadratic deviation signals.

16. A system according to claim 15, wherein said external parameters comprise signals indicative of engine speed, engine load or the condition of a combustion mixture ratio control.

17. A system according to claim 16, wherein said enabling module comprises a look-up table which receives said external parameters to set said period.

18. A system according to claim 14, further comprising
- a first comparator which compares the output signals corresponding to the first sensor input channel and a reference threshold value, said first comparator generating a fault signal indicating a faulty first sensor; and
- a warning unit sensitive to said fault signal of said first comparator, said warning unit communicating a faulty condition of said first sensor.

19. A system according to claim 13, further comprising:
- a second difference calculating node which receives the output signals from said input channels and which determines differences between said output signals, wherein said efficiency signals are derived from said differences.

20. A system according to claim 19, further comprising:
- a reciprocal calculating module which determines reciprocals of the output signals from said first sensor integration path;
- a multiplication node which multiplies said reciprocals and said differences and which generates a normalized output signals; and
- a second comparator which compares the normalized output signals and a second reference threshold value, said second comparator generating said efficiency signals related to the efficiency of said catalyst.

21. A system for monitoring efficiency of a catalyst by analysis of upstream and downstream signals, comprising:
- a first lambda sensor which samples gases upstream of said catalyst and which generates a first input signal;
- a second lambda sensor which samples gases downstream of said catalyst and which generates a second input signal;
- a microprocessor having dual input channels, said channels receiving said first and second input signals, said channels comprising:
  - dual integration paths, one for each input channel, wherein each integration path comprises:
    - a variable-average calculating module which calculates moving averages of the input signals;
    - a first difference calculating node which calculates first sets of differences between instantaneous values of the input signals and the moving averages;
    - a squaring module which squares said first sets of differences and which generates intermediate signals; and
    - an integration module which sums said intermediate signals over a period and which generates output signals;
- a first comparator which compares the output signals corresponding to the first sensor integration path and a reference threshold value, said first comparator generating fault signals indicating a faulty first sensor;
- a second difference calculating node which receives the output signals from said integration paths and which determines differences between said output signals;
- a reciprocal calculating module which determines reciprocals of the output signals from said first sensor integration path;
- a multiplication node which multiplies said reciprocals and said differences and which generates normalized output signals;
- a second comparator which compares the normalized output signals and a second reference threshold value, said second comparator generating efficiency signals related to the efficiency of said catalyst; and
- a warning unit sensitive to said fault signals of said first comparator, said warning unit communicating a faulty condition of said first sensor, said warning unit further sensitive to said efficiency signals to communicate the condition of said catalyst.

22. A system according to claim 21, including a switch sensitive to the fault signals generated by said first comparator, said switch disabling said second difference calculating node to disable the calculation of the efficiency signals when a faulty condition is detected in said upstream sensor.

23. A method of measuring an efficiency of a catalyst through which gas flow is intended to pass, including at least two sensors such as lambda sensors, which are disposed respectively upstream and downstream of said catalyst in the direction of the gas flow and which generate respective output signals having respective instantaneous values, said method comprising the steps of:

for each sensor, calculating moving averages of said instantaneous values of said output signals;

for each sensor, calculating differences between said instantaneous values of said output signals and said moving averages in order to generate difference signals relating to the difference between said instantaneous values and said moving averages;

calculating output efficiency signals indicative of the efficiency of the catalyst on the basis of the difference signals or signals derived therefrom; and receiving said efficiency signals at a warning unit, said warning unit responsive to said efficiency signals and generating a warning signal when said catalyst is operating inefficiently.

24. A method according to claim 23, wherein the step of calculating output efficiency signals comprises calculating the output efficiency signals from at least one of a ratio and a difference between the difference signals or signals derived therefrom.

25. A method according to claim 23, wherein the step of calculating output efficiency signals comprises squaring the difference signals.

26. A method according to claim 23, wherein the step of calculating output efficiency signals comprises integrating the difference signals.

27. A method according to claim 23, wherein the step of calculating output efficiency signals comprises squaring the difference signals and integrating the squared difference signals.

* * * * *